(12) United States Patent
Sirota et al.

(10) Patent No.: US 11,286,671 B2
(45) Date of Patent: Mar. 29, 2022

(54) MOBILE FABRIC WATER TOWER SYSTEM

(71) Applicant: THE REGENTS OF THE UNIVERSITY OF MICHIGAN, Ann Arbor, MI (US)

(72) Inventors: Anya Sirota, Ann Arbor, MI (US); Jean Louis M. Farges, Ann Arbor, MI (US)

(73) Assignee: THE REGENTS OF THE UNIVERSITY OF MICHIGAN, Ann Arbor, MI (US)

( * ) Notice: Subject to any disclaimer, the term of this patent is extended or adjusted under 35 U.S.C. 154(b) by 78 days.

(21) Appl. No.: 16/648,081

(22) PCT Filed: Sep. 14, 2018

(86) PCT No.: PCT/US2018/051161
§ 371 (c)(1),
(2) Date: Mar. 17, 2020

(87) PCT Pub. No.: WO2019/055836
PCT Pub. Date: Mar. 21, 2019

(65) Prior Publication Data
US 2020/0284038 A1 Sep. 10, 2020

Related U.S. Application Data

(60) Provisional application No. 62/559,832, filed on Sep. 18, 2017.

(51) Int. Cl.
*E04D 13/08* (2006.01)
*A01G 25/00* (2006.01)
(Continued)

(52) U.S. Cl.
CPC ............. *E04D 13/08* (2013.01); *A01G 25/00* (2013.01); *E03B 1/041* (2013.01); *E03B 3/03* (2013.01);
(Continued)

(58) Field of Classification Search
CPC ............ E04D 13/08; E04D 2013/0873; E04D 2013/0893; E03B 3/03; E03B 2001/047; A01G 9/12–128; A01G 25/00
(Continued)

(56) References Cited

U.S. PATENT DOCUMENTS 2,672,253 A * 3/1954 Lindberg ............... B65D 90/14
220/567
2,741,268 A * 4/1956 Plunkett .................. E04H 12/30
138/148

(Continued)

FOREIGN PATENT DOCUMENTS

EP 0823987 A1 * 2/1998 ............. A01G 17/06

OTHER PUBLICATIONS

International Search Report and Written Opinion issued in PCT/US2018/051161, dated Nov. 21, 2018, ISA/US.

*Primary Examiner* — Kevin F Murphy
(74) *Attorney, Agent, or Firm* — Harness, Dickey & Pierce, P.L.C.

(57) ABSTRACT

A water tower system having a catchment system to collect climatically-produced water and route the water to an output; a water mattress system fluidly coupled below to the catchment system to collect the water from the catchment system; an elevated water tower storage system fluidly coupled to the water mattress system to receive and store water from the water mattress system, the elevated water tower storage system is located at or below the water mattress system; and a water distribution system fluidly
(Continued)

coupled to the elevated water tower storage system to receive water from the elevated water tower storage system and distribute the water to a predetermined location.

12 Claims, 2 Drawing Sheets

(51) Int. Cl.
  *E03B 1/04* (2006.01)
  *E03B 3/03* (2006.01)
(52) U.S. Cl.
  CPC .............. *E03B 2001/047* (2013.01); *E04D 2013/0873* (2013.01); *E04D 2013/0893* (2013.01)
(58) Field of Classification Search
  USPC ........................................... 220/567
  See application file for complete search history.

(56) References Cited

U.S. PATENT DOCUMENTS

| | | | |
|---|---|---|---|
| 5,730,179 A * | 3/1998 | Taylor | E04D 13/08 |
| | | | 137/357 |
| 6,378,546 B1 * | 4/2002 | Hansen | E03B 11/06 |
| | | | 137/208 |
| 6,941,702 B1 * | 9/2005 | Abrams | E03B 1/041 |
| | | | 52/16 |
| 8,397,746 B1 | 3/2013 | Taborek | |
| 8,496,810 B2 | 7/2013 | Forrest | |
| 8,689,819 B2 | 4/2014 | Hashimoto et al. | |
| 9,279,271 B2 * | 3/2016 | McDowell | E04H 17/00 |
| 2009/0114655 A1 * | 5/2009 | Weatherstone | E03B 3/03 |
| | | | 220/495.05 |
| 2010/0199574 A1 | 8/2010 | Perlatti | |
| 2010/0288375 A1 | 11/2010 | Thomas | |
| 2011/0005602 A1 * | 1/2011 | Harrington | E03B 1/04 |
| | | | 137/1 |

* cited by examiner

MOBILE FABRIC WATER TOWER SYSTEM

CROSS-REFERENCE TO RELATED APPLICATIONS

This application is the U.S. National Phase Application under 35 U.S.C. 371 of International Application No. PCT/US2018/051161 filed on Sep. 14, 2018, which claims the benefit of U.S. Provisional Application No. 62/559,832, filed on Sep. 18, 2017. The entire disclosures of the above applications are incorporated herein by reference.

FIELD

The present disclosure relates to a water distribution in urban settings and, more particularly, relates to water distribution in urban settings using a mobile fabric water tower system.

BACKGROUND AND SUMMARY

This section provides background information related to the present disclosure which is not necessarily prior art. This section also provides a general summary of the disclosure, and is not a comprehensive disclosure of its full scope or all of its features.

There are currently over 1200 urban farms and community gardens in Detroit, Mich. alone. While the practice of cultivating food and creating shared growing environments has proven critical to the wellbeing of many neighborhoods in the city, questions surrounding water management and sustainability endure in many urban farms around the world.

In many locations, urban farms are struggling to develop sensible and reliable systems for irrigation. Many current solutions, such as tapping into a city's drinking water supply, often prove economically unfeasible due to integrated sewage treatment and water distribution costs. Additionally, conventional catchment surfaces, such as rooftop materials, pavements, or painted patios, when combined with the slight acidity of urban rainwater, risk contaminating the local food supply produced by urban farms. Finally, while runoff is a threat to water quality in much of the industrialized world, the addition of agricultural waste in urban scenarios acutely exacerbates the problem.

Moreover, conventional water containment systems (including industrial cisterns, retention ponds, static sacks, and tanks) are space consuming, difficult to move, and visually deficient in the urban context. More particularly, although it is known to use water tanks and water bladders in many residential and commercial applications, these solutions are relatively large in scale and, thus, are cumbersome to relocate even when empty and certainly immobile when full.

According to the principles of the present teachings, a mobile fabric water tower system (aka Mobile Fabric Water Tower) is provided that provides a simple and convenient water collection, storage, and distribution system that is simple to locate, manage, and install. The present system is lightweight and deployable in a portable solution that employs expandable membranes that are both artful and easy to identify with and self-manageable.

More particularly, according to the principles of the present teachings, a water tower system is provided having a catchment system to collect climatically-produced water and route the water to an output; a water mattress system fluidly coupled below to the catchment system to collect the water from the catchment system; an elevated water tower storage system fluidly coupled to the water mattress system to receive and store water from the water mattress system, the elevated water tower storage system is located at or below the water mattress system; and a water distribution system fluidly coupled to the elevated water tower storage system to receive water from the elevated water tower storage system and distribute the water to a predetermined location.

The Mobile Fabric Water Tower of the present teachings is the only such micro-infrastructure on the market and provides an innovative, deployable, micro infrastructural solution for water containment and distribution in support of sustainable, low-impact urban farming. In some embodiments, the water tower system is composed of impermeable, heat resistant, expandable membranes. The light, mobile tower is conceived for function and beauty. When aggregated, they create a sense of place having potential application in urban farms, residential gardens, public parks with pavilions or architectural structures, community-led public space initiatives, etc.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
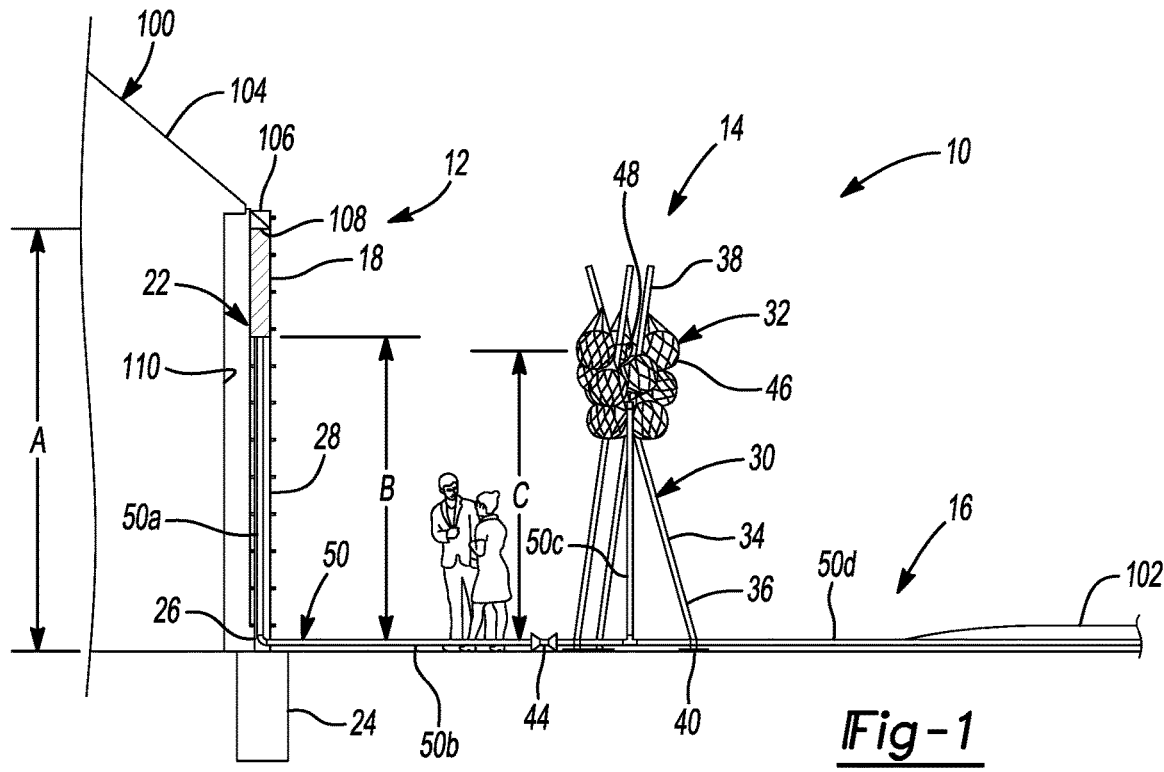
FIG. 1 is a schematic view of a mobile fabric water tower system according to some embodiments of the present teachings.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 2:
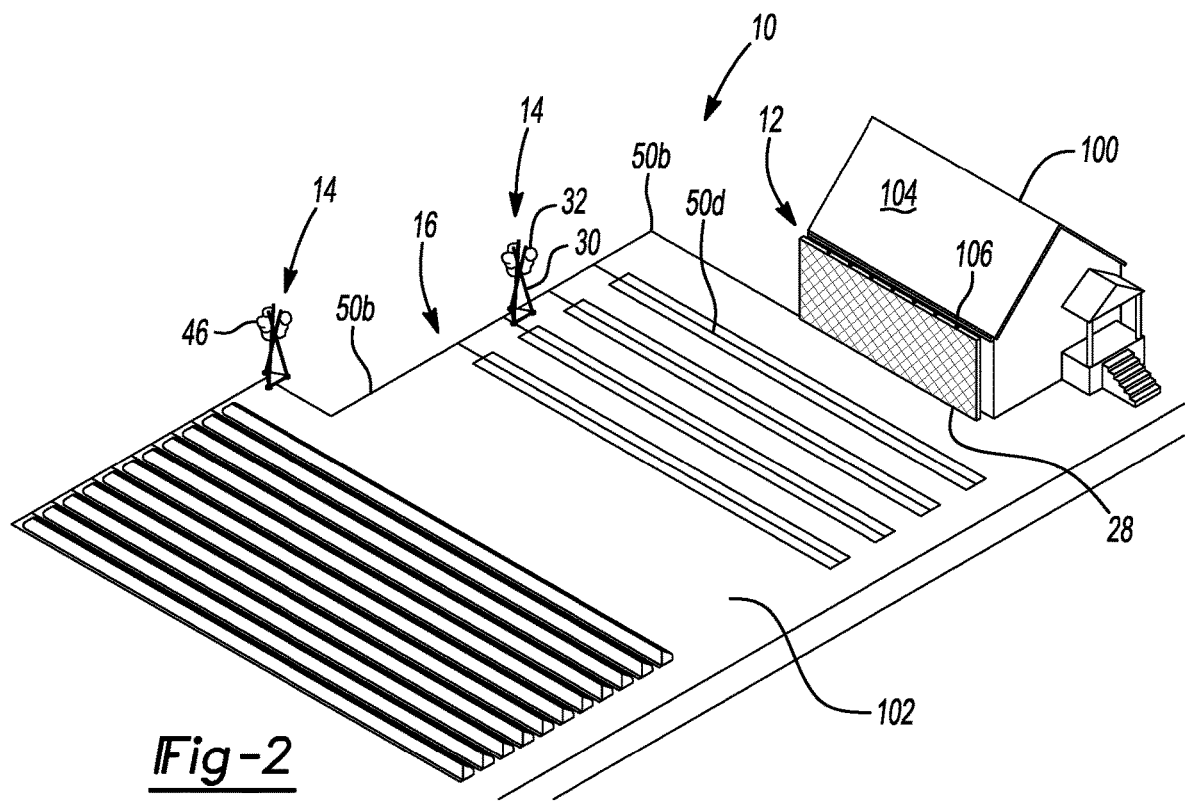
FIG. 2 is a perspective view of the mobile fabric water tower system according to some embodiments of the present teachings.
Figure 3:
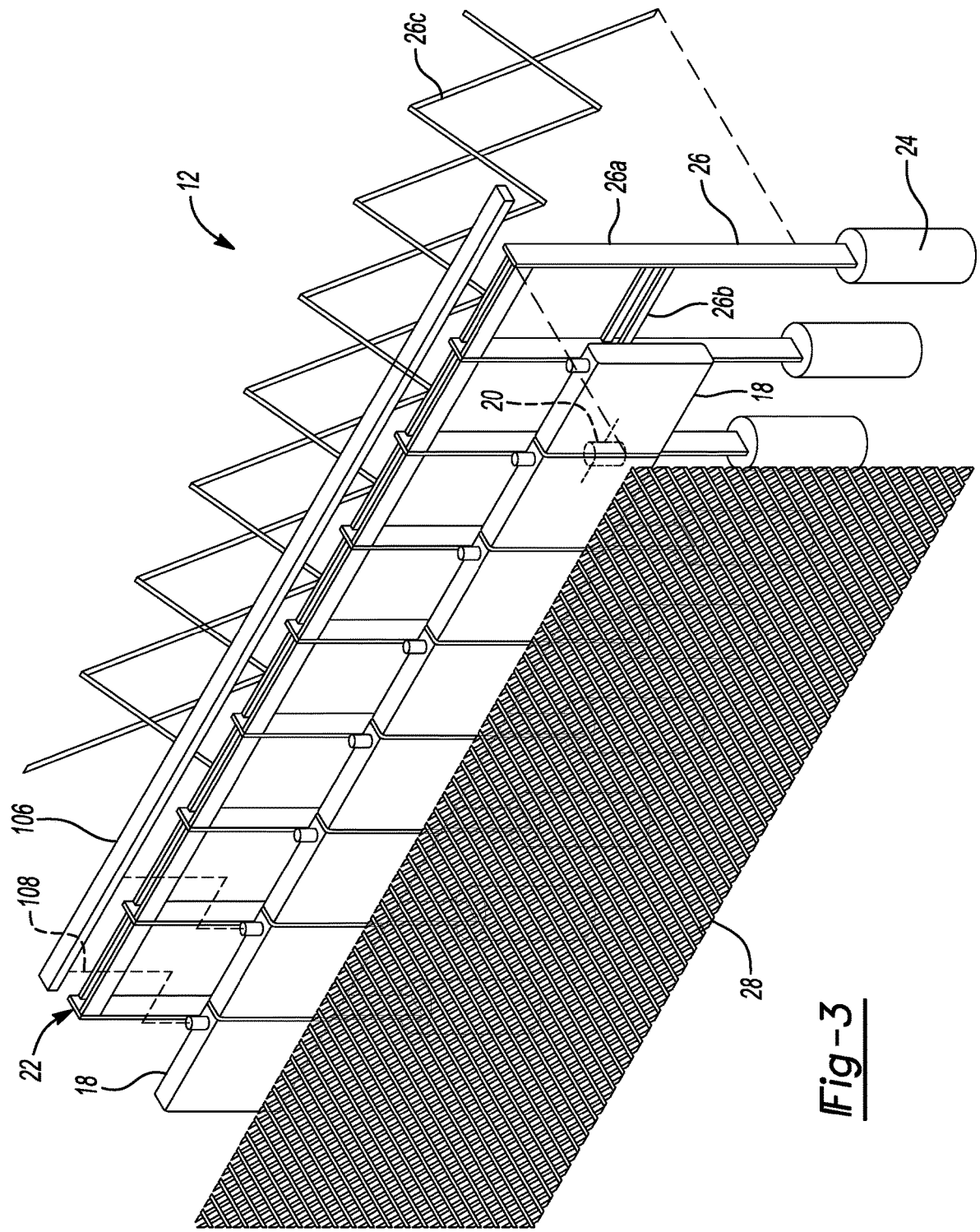
FIG. 3 is a perspective view of a water mattress system according to some embodiments of the present teachings.

In accordance with the principles of the present teachings, as illustrated in FIGS. 1-3, a water tower system 10 is provided for use with an existing or newly built building or catchment system 100. In some embodiments, water tower system 10 is composed of multiple components related to the catchment, storage, and distribution of rainwater. Together, these components produce a gravity driven solution for the management of green storm water infrastructure and irrigation particularly adapted and configured for use in an urban environment. As an aggregate, water tower system 10 is designed to be integrated with existing building structure or new construction 100, offering a relatively inexpensive, visually compelling solution to contemporary water management and irrigation challenges. Depending on the scale and number of components deployed in response to a particular context and its requirements, water tower system 10 can be adjusted to serve the water management and irrigation needs of urban farms, residential homes, pavilions, or small-scale commercial buildings.

With particular reference to FIGS. 1-3, in some embodiments, water tower system 10 comprises a water mattress system 12 operably, physically, and/or fluidly coupled to an elevated water tower storage system 14 for storage and distribution of green storm water to an irrigation or water distribution system 16 for outputting in a controlled and/or distributed manner the green storm water to an urban garden 102.

As illustrated in FIGS. 1 and 2, in some embodiments, building structure 100 can comprise a home, factory, building, store, or other structure having an elevated water catchment system 104, such as a roof, patio, decking, or artificial surface, that collects rainwater, moisture, runoff, condensation, and/or other water and routes such water to an output, such as a drain or gutter system 106. In this way, catchment system 104 and gutter system 106 together operate in a conventional manner to collect green storm water, or other naturally-occurring climatically-produced water, and route it to an output, such as a gutter drain 108 of gutter system 106. As illustrated in FIG. 1, catchment system 104, gutter system 106, and particularly gutter drain 108 are disposed at a first height or elevation A above urban garden 102 to permit a gravity-driven system therebetween. It should be understood that the principles of the present invention and the illustrated embodiment are predicated on a gravity-driven system; however, it should not be regarded that the present teachings exclude motorized or non-motorized pumps to facilitate movement and storage of the collected water from building structure 100.

In some embodiments, as illustrated in FIGS. 1 and 3, water mattress system 12 of water tower system 10 can comprise a collection system that connects or otherwise is operably, physically, and/or fluidly coupled to gutter drain 108 of gutter system 106 and water catchment system 104 to collect water from the catchment system 104. In some embodiments, water mattress system 12 can comprise one or more water catchment vessels 18 fluidly coupled to gutter drain 108 of gutter system 106. In some embodiments, each of the one or more water catchment vessels 18 is fluidly coupled to one or more gutter drains 108 of gutter system 106 so as to each receive direct fillage of water from catchment system 104. However, it should be understood that each of the one or more water catchment vessels 18 can be fluidly coupled to one or more of the remaining water catchment vessels 18 to define a vessel array. In some embodiments, it may be desirable to ensure that each of the water catchment vessels 18 is fluidly independent from other water catchment vessels 18 to minimize the potential for a breach or failure of one water catchment vessels 18 to corrupt or jeopardize the integrity of the remaining water catchment vessels 18. However, in some embodiments, it may be desirable to ensure that each of the water catchment vessels 18 are fluidly coupled to other water catchment vessels 18 to properly balance the filling or drawing down of water catchment vessels 18 during operation. In some embodiments, both desires can be achieved through a valve system 20 disposed between at least some of the water catchment vessels 18 to manage the communication therebetween. These valves 20 may remain open to permit cross-filling or closed to compartmentalize water storage to permit replacement or repair of individual water catchment vessels 18.

In some embodiments, water catchment vessels 18 can be made of non-gas emitting waterproof fabric or other collapsible lightweight material to permit ease of transportation and setup, while maintaining reliable and safe use in varying locations and environmental conditions.

In some embodiments, water mattress system 12 is held off the ground and in close proximity to gutter system 106 with a free-standing wall structure 22 (that is separate or a part of water mattress system 12) that adheres to the elevational logics of an existing or new architectural wall surface 110 of, for example, building 100. In some embodiments, wall structure 22 is made of standard building elements, which may include, but are not limited to, wood studs, steel beams, or aluminum piping, depending on available budgets and desired material effects. Wall structure 22 can be grounded with typical concrete footings 24, engineered in response to the projected load from water mattress system 12 being held off the ground at a second height or elevation B to maximize the water pressure and flowrate from gravity in order to distribute the water to elevated water tower storage system 14 in the landscape. Footings 24 can be coupled to structural supports 26, such as vertical studs 26a and horizontal brace members 26b. It should be understood that in some embodiments, wall structure 22 can comprise cross braces 26c to provide enhanced lateral support and rigidity.

Additionally, it should be understood that water mattress system 12 can be supported with any structure that permits reliable support of the projected load from water mattress system 12. In some embodiments, water mattress system 12 can be mounted directly to wall structure 110 of building 100, thereby eliminating the need for free-standing wall structure 22. However, it should be recognized that wall structure 110 must be sufficient to withstanding the projected loading forces. To this end, water catchment vessels 18 can be mounted to wall structure 110 of building 100 at second height or elevation B.

With particular reference to FIG. 3, in some embodiments, a lattice structure 28 can be coupled to water mattress system 12 and/or wall structure 22 to conceal water mattress system 12 and/or wall structure 22, and further, in some embodiments, to provide a planting matrix for supporting vegetation or other productive food growth. Lattice structure 28 and/or water mattress system 12 can further function to offset solar impact on building 100, thereby reducing internal building temperature and/or cooling requirements.

The scale of water mattress system 12 is dependent on several factors, such as but not limited to the size of water catchment system 104 of building 100, the climatically available rainfall amount and frequency, the anticipated gardening water needs, and the anticipated storage requirements.

With reference to FIG. 1, elevated water tower storage system 14 is illustrated having a water tower structure 30 and a water bag system 32.

In some embodiments, water tower structure 30 can comprise a vertical structure having at least three vertical posts configured to support water bag system 32 at a third height or elevation C. In some embodiments, third height C of bag system 32 is at or below second height B of water mattress system 12. In some embodiments, third height C of bag system 32 is below second height B of water mattress system 12 to ensure emptying of water mattress system 12.

In some embodiments, water tower structure 30 can comprise a tripod (i.e. 3 member arrangement) or teepee (i.e. 3 or more member arrangement) support that includes a plurality of generally longitudinal members 34 being arranged in a crossing pattern whereby the base end 36 of the longitudinal members 34 is spaced apart from each other and a top end 38 of the longitudinal members 34 are generally crossing each other and bound together at an end or intermediate point to effectively transfer loading forces down to the ground structure. Base ends 36 of longitudinal members 34 can be placed in direct contact with ground structure, upon intermediate supports, or within a framed structure 40 operable to restrain longitudinal members 34 in a predetermined configuration. Lateral bracing can be used to stabilize water tower structure 30, if necessary. However, it should be understood that in many embodiments, water tower structure 30 is not permanently mounted in a singular location to permit convenient reconfiguration of the urban garden or to transport to new locations. In this way, water tower structure 30 can be easily collapsible and movable from one location to another. The water tower structure 30 can be made of wood or metal depending on available materials and budgets.

Water tower structure 30 can support basic water filtration capabilities to filter sand, debris, and other particulates that may clog the irrigation lines. A low-friction one-way check valve 44 connected to the structure is designed to prevent water from reversing the direction of the system and returning to water mattress system 12.

With reference to FIG. 1, in some embodiments, bag system 32 comprises a plurality of bags or sacks 46 (e.g. collapsible vessels) configured to receive water from water mattress system 12 and selectively dispense water to the water distribution system 16. In some embodiments, each of the plurality of bags 46 can be made of non-toxic vinyl coated polyester scrim or a similar non-gas emitting waterproof fabric. In some embodiments, each of the plurality of bags 46 can hold a minimum of 50 gallons of water. When empty, the plurality of bags 46 are relatively light, and can be easy transported in the landscape. Each unit allows for the assembly of the appropriate number of bags 46 for the requirements of the planted landscape in a given context.

A multi-pronged central connector 48 allows for the attachment of the plurality of bags 46 into the aggregate bag system 32. The connector 48 can be fabricated using steel and PVC and provide fluidic coupling of a supply line 50 from water mattress system 12 supplying water to each of the plurality of bags 46 of bag system 32. Supply line 50 can comprise a plurality of sections, such as but not limited to a first section 50a extending vertically from water mattress system 12, a second section 50b extending generally horizontally along a ground surface, and a third section 50c extending vertically from the second section 50b to the connector 48.

In some embodiments, bag system 32 can be coupled to and supported on water tower structure 30 via an external netting system 52. In some embodiments, bag system 32 can be coupled to and supported on water tower structure 30 via a grommet connector system.

In some embodiments, each of the plurality of bags 46 can be shaped using patterns cut from the non-toxic waterproof fabric with welded seams. The shape of the plurality of bags 46 is a negotiation between the visual appeal of a cellular system that offers the possibility of a plant-like, biomorphic aggregate, and the complexity of welding waterproof patterns.

Finally, the plurality of bags 46 are individually and/or collectively fluidly coupled to irrigation system 16 via third section 50c of supply line 50 and one or more distribution sections 50d fluidly coupled to irrigation outputs, such as conventional drip irrigation outputs. Depending on particular valving scenarios, distribution seconds 50d can be positioned either "upstream" and/or "downstream" of elevated water tower storage system 14 (see FIG. 2). In some embodiments, distribution sections 50*d* can be a conventional garden hose.

The distribution of water is primarily gravity powered, with the option of a pump assist if necessary. Unplugged from the drip irrigation system, the host offers the ability for gardens to water plants by hand.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A water tower system comprising:
   a catchment system configured to collect climatically-produced water and route the water to an output, the catchment system being at a first elevation;
   a water mattress system fluidly coupled to the catchment system, the water mattress system configured to collect the water from the output of the catchment system, the water mattress system being at a second elevation, the second elevation being below the first elevation;
   an elevated water tower storage system fluidly coupled to the water mattress system, the elevated water tower storage system configured to receive and store water from the water mattress system, the elevated water tower storage system being at a third elevation, the third elevation being at or below the second elevation;
   a water distribution system fluidly coupled to the elevated water tower storage system, the water distribution system configured to receive water from the elevated water tower storage system and distribute the water to a predetermined location;
   a water catchment vessel fluidly coupled to the catchment system;
   a wall structure supporting the water catchment vessel at the second elevation, the wall structure having a foundation configured to support a projected load of water and a structural support operably coupled to the foundation, the structural support configured to be physically coupled with and supporting the water catchment vessel; and
   a lattice structure operably coupled to at least one of the structural support and the water catchment vessel, the lattice structure being configured to support vegetation or productive food growth.

2. The water tower system according to claim 1, wherein the catchment system comprises a rooftop and gutter system of a building.

3. The water tower system according to claim 1, wherein the water mattress system is configured to collect the water from the output of the catchment system in response to gravity.

4. The water tower system according to claim 1, wherein the water mattress system comprises:
   a water catchment vessel fluidly coupled to the catchment system, the water catchment vessel being made of a non-gas emitting waterproof fabric.

5. The water tower system according to claim 1, wherein the water mattress system comprises:
   a water catchment vessel fluidly coupled to the catchment system, the water catchment vessel being made of a lightweight collapsible material.

6. The water tower system according to claim 1, wherein the water mattress system comprises:
   a plurality of water catchment vessels fluidly coupled to the catchment system, each of the plurality of water catchment vessels being selectively fluidly coupled to another of the plurality of water catchment vessels.

7. A water tower system comprising:
   a catchment system configured to collect climatically-produced water and route the water to an output, the catchment system being at a first elevation;
   a water mattress system fluidly coupled to the catchment system, the water mattress system configured to collect the water from the output of the catchment system, the water mattress system being at a second elevation, the second elevation being below the first elevation;
   an elevated water tower storage system fluidly coupled to the water mattress system, the elevated water tower storage system configured to receive and store water from the water mattress system, the elevated water tower storage system being at a third elevation, the third elevation being at or below the second elevation;
   a water distribution system fluidly coupled to the elevated water tower storage system, the water distribution system configured to receive water from the elevated water tower storage system and distribute the water to a predetermined location;
   a plurality of longitudinal members disposed in a crossing pattern such that base ends of the plurality of longitudinal members are spaced apart and top ends of the plurality of longitudinal members are generally spaced a distance less than the base ends, an intermediate portion of the plurality of longitudinal members generally contacts and are joined to form a tripod or teepee type configuration;
   wherein the elevated water tower storage system having a water bag system configured to receive water from water mattress system and selectively dispense water to the water distribution system and a water tower structure configured to support water bag system at the third elevation.

8. The water tower system according to claim 7 wherein the plurality of longitudinal members are collapsible.

9. The water tower system according to claim 7 wherein the water bag system comprises:
   one or more bag members configured to receive water from the water mattress system in response to gravity flow.

10. The water tower system according to claim 9 wherein the one or more bag members are each made of a non-gas emitting waterproof fabric.

11. The water tower system according to claim 7 wherein the water bag system comprises:
    a plurality of collapsible vessels being fluidly coupled to a central fluidic connector fluidly coupled to a supply line from the water mattress system.

12. The water tower system according to claim 7 wherein the water bag system comprises:
    one or more bag members configured to receive water from the water mattress system in response to gravity flow; and
    a netting system coupling the one or more bag members to the water tower structure.

\* \* \* \* \*